(12) United States Patent
Huang et al.

(10) Patent No.: US 6,774,821 B2
(45) Date of Patent: Aug. 10, 2004

(54) FREQUENCY MAPPED CODING FOR SIGNAL ERROR CORRECTION

(75) Inventors: William Xiao-Qing Huang, San Ramon, CA (US); Yanbin Yu, Fremont, CA (US); Dongtai Liu, Fremont, CA (US)

(73) Assignee: UTStarcom, Inc., Alameda, CA (US)

(*) Notice: Subject to any disclaimer, the term of this patent is extended or adjusted under 35 U.S.C. 154(b) by 0 days.

(21) Appl. No.: 10/676,053

(22) Filed: Sep. 30, 2003

(65) Prior Publication Data

US 2004/0117712 A1 Jun. 17, 2004

Related U.S. Application Data

(60) Provisional application No. 60/415,169, filed on Sep. 30, 2002.

(51) Int. Cl.[7] .......................... H03M 7/00; H04B 15/00
(52) U.S. Cl. ............................. 341/50; 341/51; 341/61; 375/202; 375/200; 375/324; 455/226
(58) Field of Search ............................. 341/50, 51, 61; 375/202, 200, 32; 455/226

(56) References Cited

U.S. PATENT DOCUMENTS

| | | | | |
|---|---|---|---|---|
| 5,136,611 A | * | 8/1992 | Kirimoto et al. | ............ 375/130 |
| 5,307,376 A | * | 4/1994 | Castelain et al. | ............ 375/260 |
| 5,410,538 A | * | 4/1995 | Roche et al. | ................ 455/450 |
| 5,442,660 A | * | 8/1995 | Kuo et al. | ................... 375/134 |
| 6,028,886 A | * | 2/2000 | Koga et al. | .................. 375/324 |

* cited by examiner

Primary Examiner—Michael Tokar
Assistant Examiner—Lam T Mai
(74) Attorney, Agent, or Firm—Felix L. Fischer (57) ABSTRACT

A Frequency Mapping Coding (FMC) scheme varies the application of error correction redundancy to transmitted data based on the channel transmission characteristics and the likelihood of error resulting from characteristics of the data stream being transmitted over the channel. The FMC is an error correction coding scheme making use of the non-linear feed-back mechanism and variable bit input step size to control redundancy applied. The FMC scheme accommodates the non-symmetrical nature of the SNR in bandwidth limited communications environments such as DSL to allow application of IQ based modulation, such as QAM, to these channels and is flexible for varying channel characteristics.

7 Claims, 11 Drawing Sheets

| Last Sample Offset | Current Sample Offset | Next Sample Offset | Relative Damage, i.e. Vulnerability | Notes |
|---|---|---|---|---|
| 0 | 0 | 0 | 3 | Freq 0 |
| 0 | 0 | π/2 | x | |
| 0 | 0 | π | x | |
| 0 | 0 | −π/2 | x | |
| π/2 | 0 | 0 | x | |
| π/2 | 0 | π/2 | x | |
| π/2 | 0 | π | x | |
| π/2 | 0 | −π/2 | x | |
| π | 0 | 0 | x | |
| π | 0 | π/2 | x | |
| π | 0 | π | x | |
| π | 0 | −π/2 | x | |
| −π/2 | 0 | 0 | x | |
| −π/2 | 0 | π/2 | x | |
| −π/2 | 0 | π | x | |
| −π/2 | 0 | −π/2 | x | |
| | | | | |
| π/2 | π/2 | π/2 | 7 | Freq 2 |
| | | | x | |
| | | | | |
| π | π | π | 4 | |
| | | | x | |
| | | | | |
| −π/2 | −π/2 | −π/2 | 0 | Freq 1 |
| | | | x | |
| | | | | |

| Input Bit | Mapping bits | Bits should be decoded |
|---|---|---|
| 00 | 00 | 00 |
| 01 | 01 | 01 |
| 10 | 10 | 1 |
| 11 | 11 | 1 |
| | | |

FREQUENCY MAPPED CODING FOR SIGNAL ERROR CORRECTION

CROSS-REFERENCE TO RELATED APPLICATIONS

This application claims priority of provisional application serial No. 60/415,169 filed on Sep. 30, 2002 having the same title as the present application.

BACKGROUND OF THE INVENTION

1. Field of the Invention

This invention relates generally to the field of error correction in bandwidth limited communications systems. More particularly, the invention provides a Frequency Mapping Coding (FMC) scheme for varying the application of error correction redundancy to the transmitted data based on the channel transmission characteristics.

2. Description of Related Art

For bandwidth limited communications environments, such as digital subscriber lines (DSL), characteristics such as the signal to noise ratio (SNR) are not uniform over the useable bandwidth for communication and are typically not even symmetrical. The SNR in the low frequency range, about 1 MHz or below, is much better than in the higher frequency range from 1 MHz to 10 MHz. Traditional quadrature amplitude modulation (QAM) communication systems are designed to work at a symmetric and relatively flat SNR characteristics and, therefore, cannot fully make use of the SNR characteristics over the entire bandwidth. Selection of a QAM scheme is therefore typically limited by the minimum SNR in the available spectrum and those portions of the spectrum having worse SNR characteristics cannot be fully used.

A common alternative solution to overcome the varying SNR over the spectrum is the use of digital multi tone modulation (DMT). In this solution, the modulated signal is divided into different tones spread over the spectrum and a different number of bits is assigned to each tone. The SNR characteristics in the different portions of the spectrum are better utilized. However, the complexity and cost associated with DMT schemes, both to implement and manage, can be significantly higher than QAM approaches. A DSL communication system employing DMT has much higher implementation complexity than a DSL with QAM. Additionally, the spectrum is not really fully used in DMT schemes, since some guard band is needed to separate the adjacent tones.

It is therefore desirable to employ QAM to avoid the complexity associated with DMT, however, correct for the channel characteristics where SNR may impact signal fidelity.

SUMMARY OF THE INVENTION

A Frequency Mapped Coding (FMC) scheme is employed to vary the error correction redundancy provided in the communications signal based on the channel characteristics for IQ based modulation. Additional redundancy is added to the coding of the signal in portions of the spectrum where SNR is low and reduced redundancy in the high SNR portions of the spectrum. The matching of the channel spectral characteristics by the FMC combined with the "analog" nature of an exemplary QAM modulation, more smoothly fits the available spectrum for better use of the channel capacity. The increased redundancy coding reduces the theoretical bit rate of the QAM channel however the constant bit error rate (BER) is maintained. Trajectories or differential positions rather than the positions of the signal in the constellation are used to measure the degree of vulnerability and add redundancy. The more vulnerable the trajectory is, the more redundancy is added, i.e. less information is transmitted.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
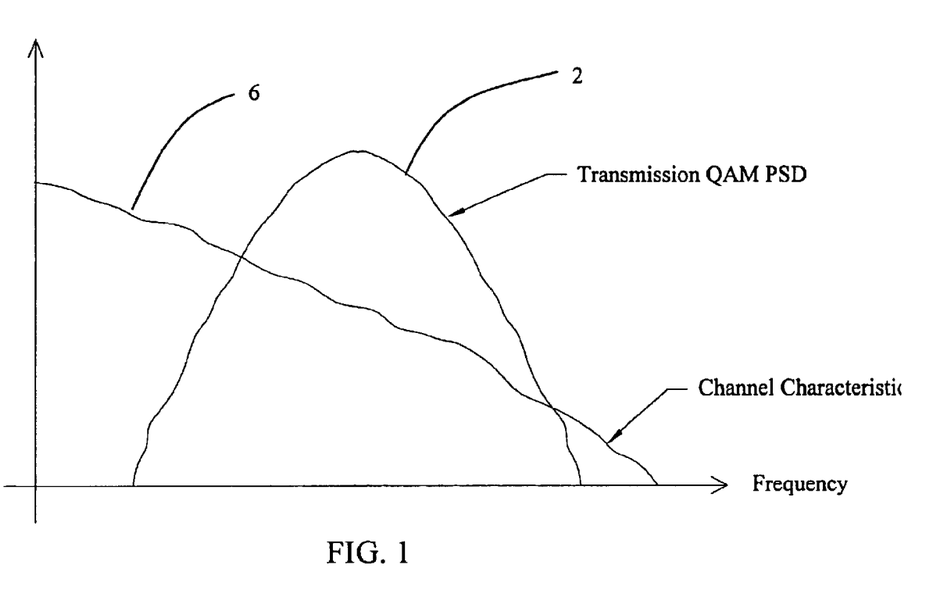
FIG. 1 is a Power Spectral Density (PSD) plot for the transmission QAM signal with the channel characteristics overlaid on the signal.
Figure 2:
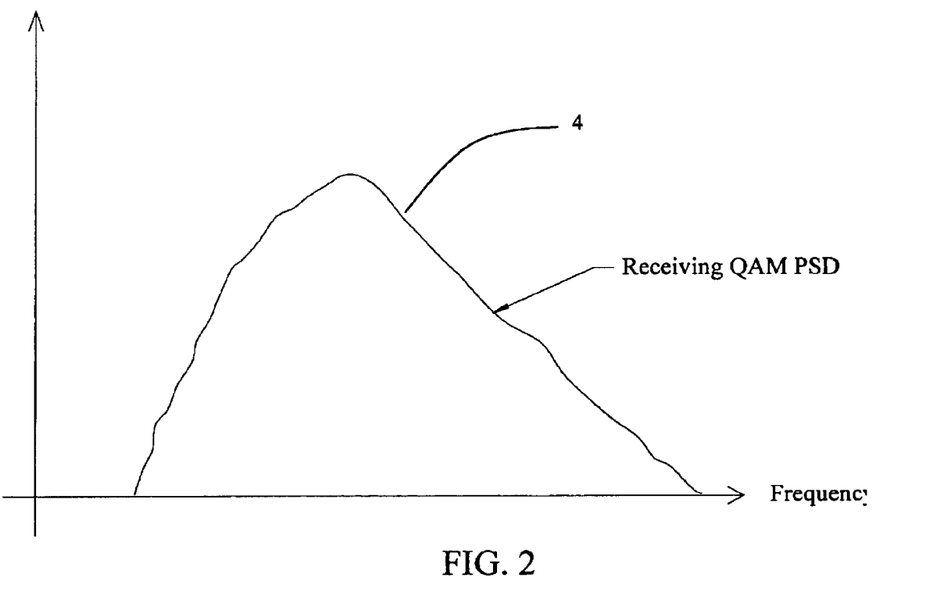
FIG. 2 is a PSD of the Receiving QAM signal.
Figure 3:
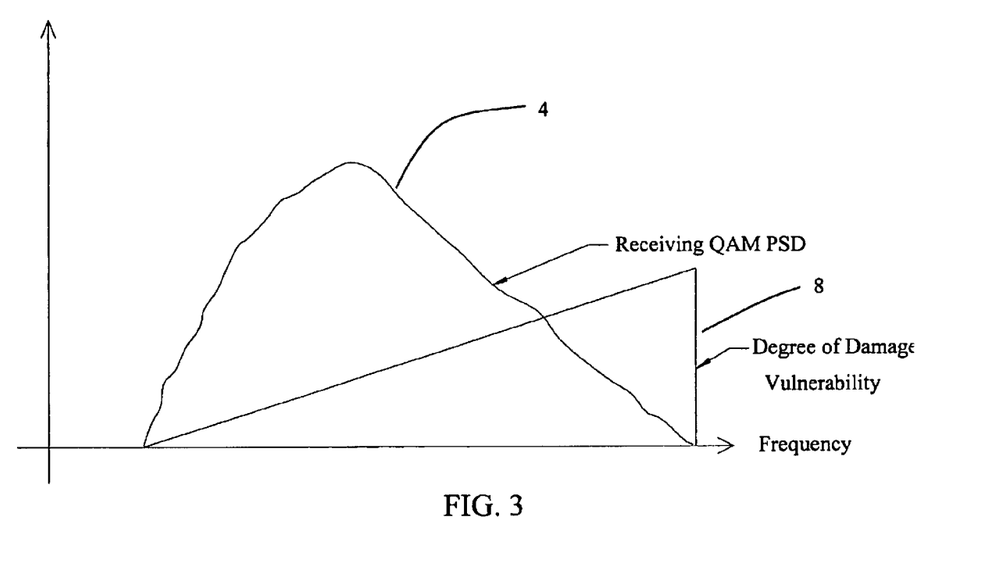
FIG. 3 is a plot of the PSD of FIG. 2 with the degree of damage to the QAM signal overlaid.
Figure 4:
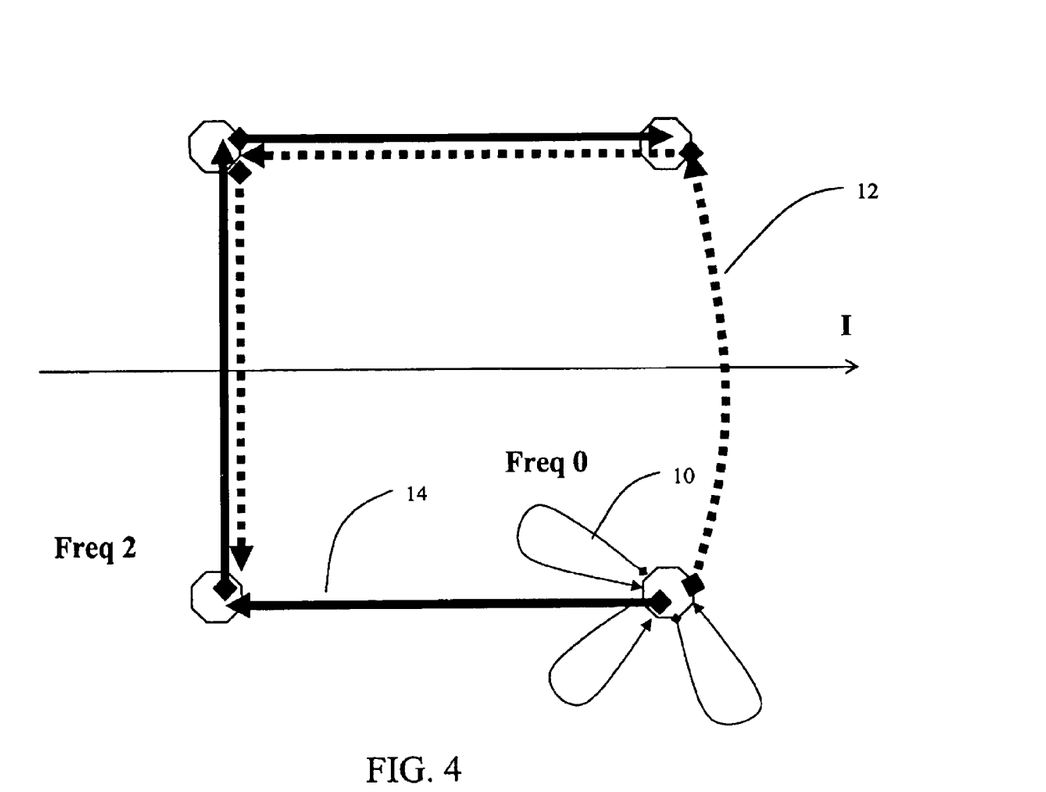
FIG. 4 is a constellation diagram for a simplified embodiment of the invention for use with Differential Quaternary Pulse Shift Keying (DQPSK) demonstrating the modulation transition trajectories in the constellation of the DQPSK modulation.
Figure 5:
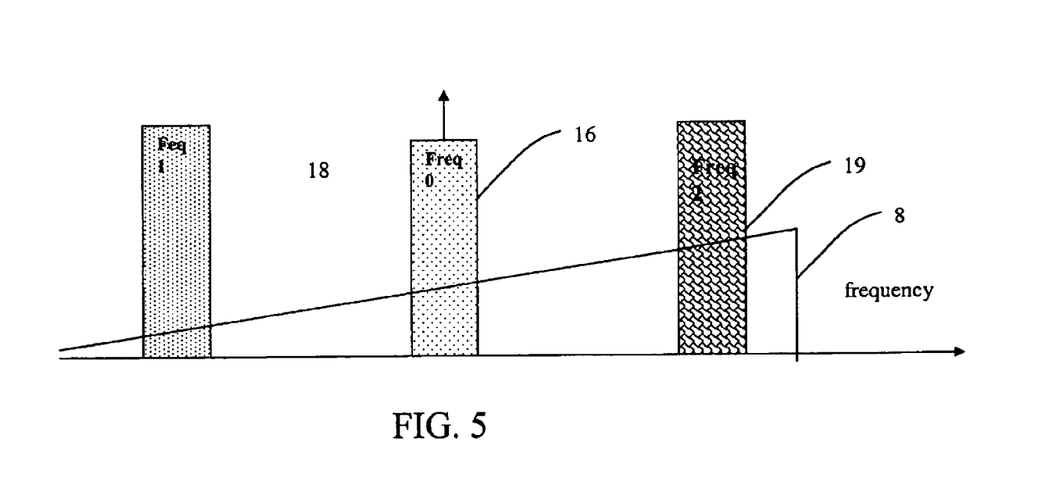
FIG. 5 shows the frequency spectrum for the trajectories shown in FIG. 5.

For the purposes of description of an embodiment of the invention, a QAM system is employed, however, the invention is applicable to other orthogonal component based modulation in general. Referring to the drawings, FIGS. 1 and 2 demonstrate the distortion of the QAM PSD from the transmitted signal PSD 2 to the received signal PSD 4 based on the channel characteristics 6. FIG. 3 demonstrates graphically the relative degree of damage 8 to the QAM signal that is caused by the characteristic of the channel. This graphical depiction indicates where and to what degree redundancy should be added for error correction of the signal. FIG. 4 shows the trajectory of the signal in the constellation while FIG. 5 shows the related spectral components resulting from those trajectories. Trajectories 10 in the lower right quadrant of FIG. 4 result in a first frequency "FREQ 0". A counter-clockwise trajectory 12 results in a second frequency "FREQ 1" while a clockwise trajectory 14 results in a third frequency "FREQ 2". As seen in FIG. 5, the response 16 at FREQ 0 falls within a portion of the PSD where only moderate damage to the signal would be anticipated. Similarly, the response 18 at FREQ 1 falls in the spectrum with little likely damage due to the channel characteristic. However, the response 19 at FREQ 2 falls in a portion of the spectrum where high damage vulnerability is present. It can be seen that different signals will generate different spectral components and therefore different degrees of damage can be caused.

Figure 6:
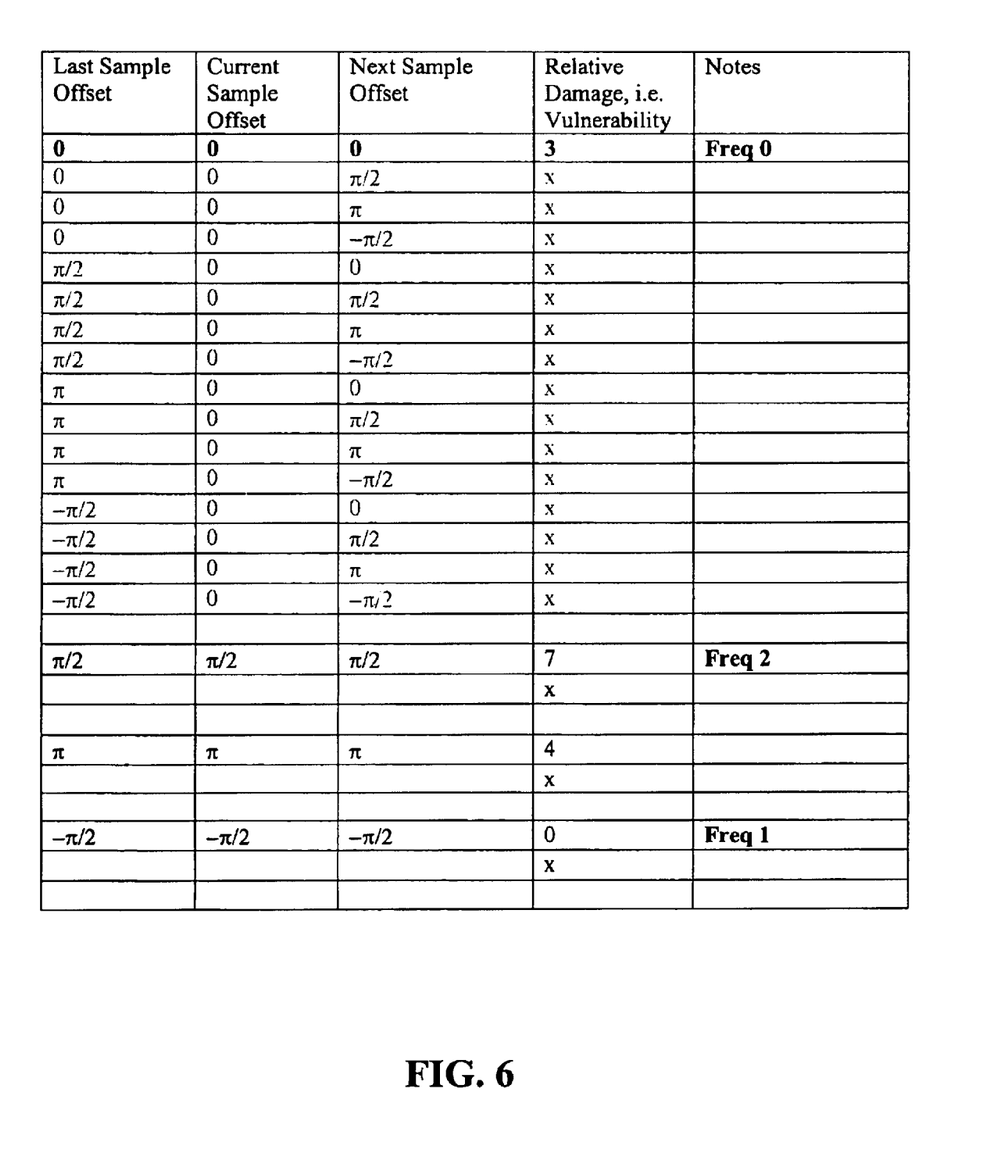
FIG. 6 is an exemplary vulnerability table for the DQPSK modulation trajectories of FIG. 5.

Continuing the DQPSK modulation example, FIG. 6 is an exemplary table demonstrating a portion of the vulnerabilities for possible trajectories. This table corresponds to the graphical depiction of FIGS. 4 and 5. For a sequence where the last sample offset was 0, the current offset is 0 and the next sample offset is 0, the relative damage or vulnerability has been defined as a "3" on a scale of 0 to 7 based on the anticipated frequency response of FREQ 0. Similarly for a last sample offset of π/2, a current sample offset of π/2 and a next sample offset ofπ/2 a relative damage of 7 is established corresponding to the anticipated frequency response of FREQ 2. A last sample offset of –π/2, a current sample offset of –π/2 and a next sample offset of –π/2 shows a relative damage vulnerability of 0 based on the anticipated frequency response of FREQ 1. Finally, a last sample offset of π, a current sample offset of π, and a next sample offset of π results in a relative damage assessment of 4.

Figure 7:
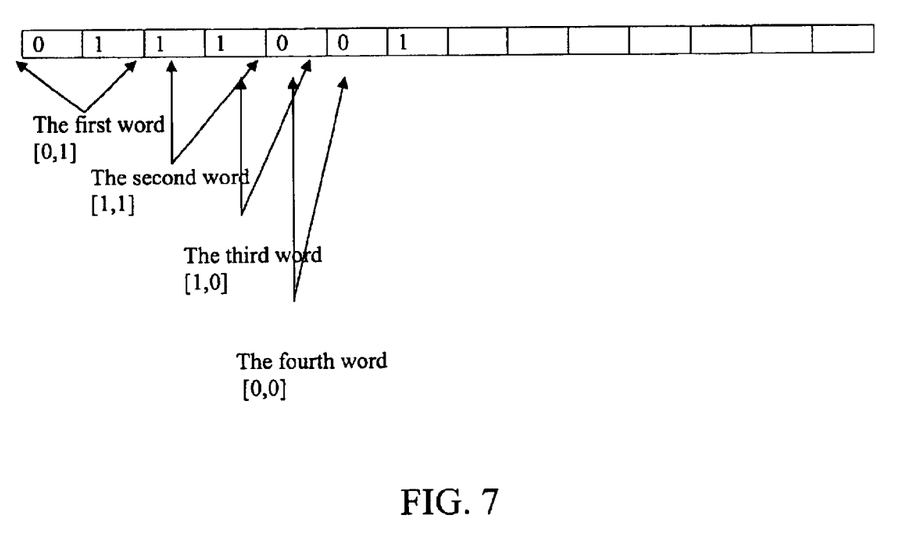
FIG. 7 is an exemplary bit stream for the DQPSK modulation with redundancy addition through a delay mechanism.
Figure 8:
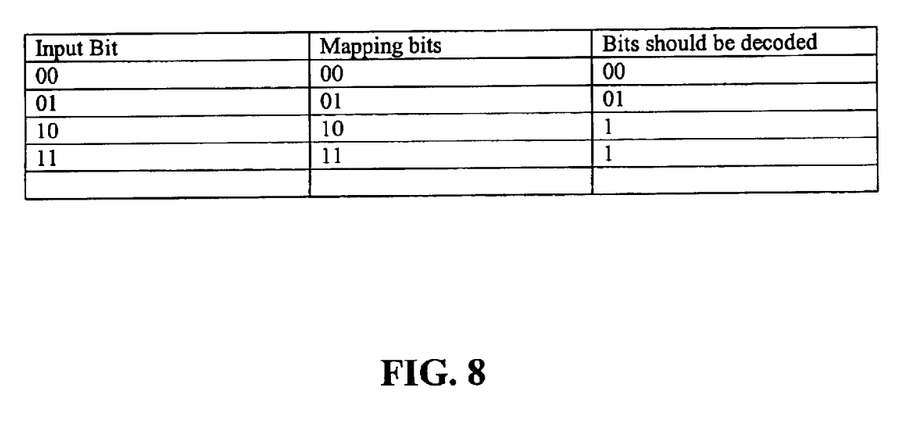
FIG. 8 is a table of the input words, mapping bits and resulting decoding for the example of FIG. 8.

A bit stream for the DQPSK modulation example is shown in FIG. 7. As an example of FMC implementation for this model, to establish redundancy based on the trajectory of the bit transmission sequence, a two bit word or sample is assumed. As shown in the table of FIG. 8, input bits of the two bit words are mapped to define decoding for the bits. If a 1 is present in the first bit, only the first bit is decoded, as will be described in further detail subsequently. The FMC redundancy is added by creating a delay and outputting the second bit of the word a second time as the first bit of the next word. Using the examples of FIG. 7, the first two bits in the sequence are [0, 1] therefore, the first word for output is [0, 1]. The next bit in the sequence is a 1. The second word output is [1, 1]; however, since the first bit of the word is a 1, the second bit is repeated in the third word which is then [1, 0]. The third word, however, now has a 1 in the first bit, consequently, the second bit is again output as the first bit of the next word, resulting the in fourth word being [0, 0]. The convolutional encoder then encodes the sample for transmission in the standard fashion.

The FMC scheme of the present invention can be characterized as a base-band error correction coding algorithm. Signal codes corresponding to higher frequencies in the spectrum have redundancy added for recovery of errors if loss occurs. The FMC scheme is also a bit allocation and management tool which is flexible if the channel characteristic changes. The FMC can adapt to achieve maximum throughput fully using the channel capacity. While similar to Multi-Dimension Trellis coding (MDTC) in the use of convolution coding and redundancy, the FMC scheme does not add the extra bits evenly or in a "color-blind" fashion. MDTC schemes are applied where frequency characteristics are always symmetrical. In the present FMC scheme, however, the unbalanced and unsymmetrical spectrum information of the channel characteristic provides the guide for selection and application of the redundancy coding.

Figure 9:
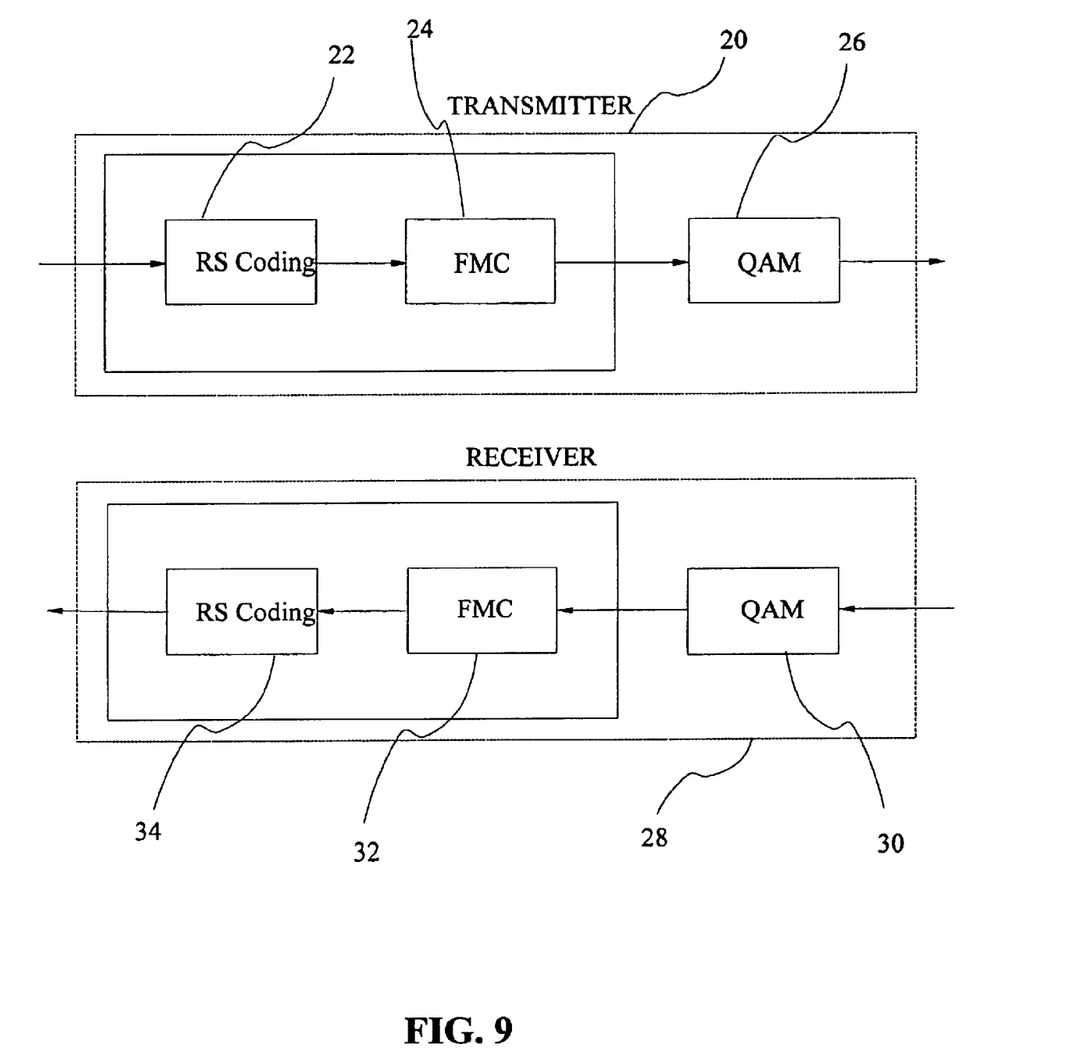
FIG. 9 is a block diagram of the elements of the system employing the present invention for transmitting and receiving data.

FIG. 9 shows the system implementation of the present invention in what effectively constitutes a concatenated code arrangement. In the transmitter 20, the signal receives an outer encoding using Reed Solomon (RS) coding in the RS Coding block 22 followed by application of additional redundancy dependant on the signal frequency and channel characteristic, as described above, in the FMC block 24. RS encoding and decoding are disclosed in the embodiments herein, however other Forward Error codes are equally applicable within the scheme. The inner coding scheme makes use of the convolution type coding to counteract the vulnerability due to the spectral deficiency. The transitional trajectories or the differential positions of the modulation dictates the spectrum that is used. As previously discussed with respect to FIGS. 7 and 8 for the simplified example, 2 bits or 1 bit can be mapped to each sample depending on whether the first bit is 0 or not. On the average the bit rate will be 1.5 bits/sample.

Figure 10:
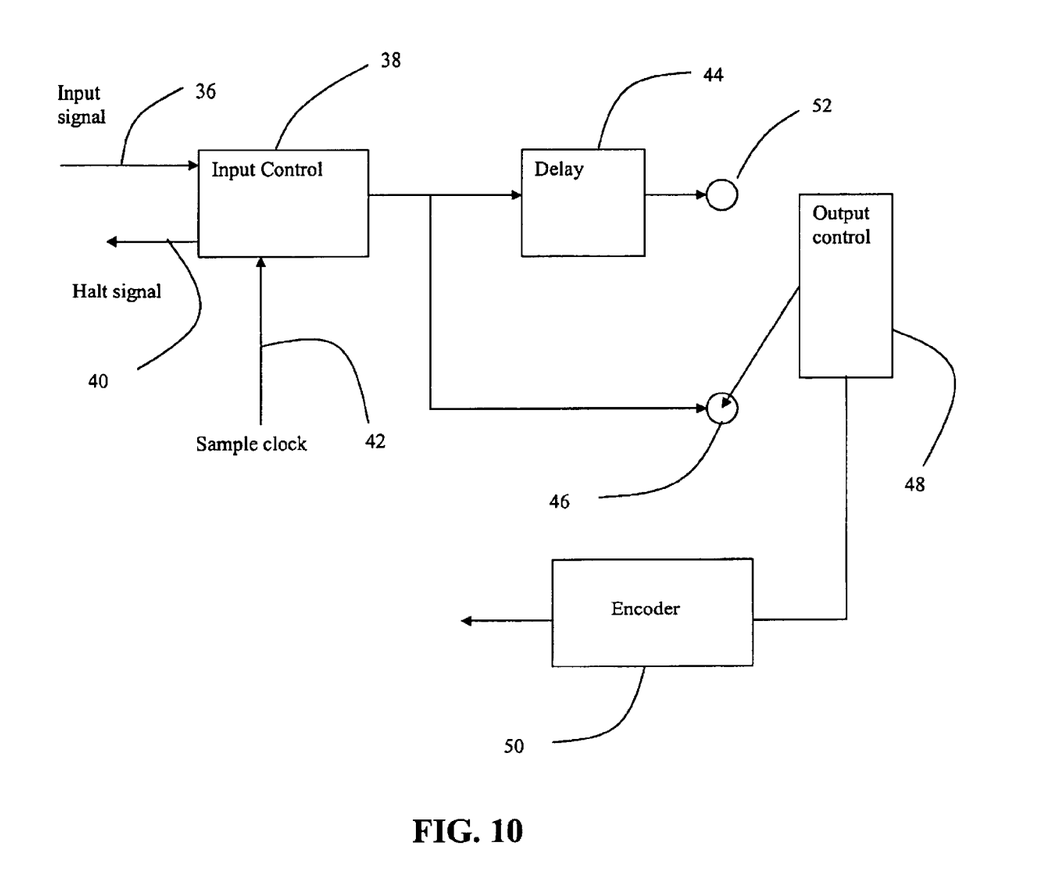
FIG. 10 is a schematic block diagram of the FMC elements for the DQPSK exemplary embodiment of FIGS. 4–9.

FIG. 10 shows the FMC components for the exemplary DQPSK redundancy. The RS coded input signal 36 is provided to an input control circuit 38 as a bit stream for formation of 2 bit words or samples. If the first bit of the word created is a "1", a halt signal 40 is generated by the input control circuit delaying input of the next bit for one clock cycle generated by the sample clock 42. The second bit present in the input control circuit is provided to a delay buffer 44 and a normal output node 46. The output control circuit 48 outputs the two bit word for encoding in the encoder 50. If a halt single has been generated, the output control circuit will switch on the next clock cycle to the delay buffer node 52 to retrieve the bit stored in the delay buffer and output that bit a second time for modulation retrieving the next bit from the input control as the second bit of the word for modulation.

Figure 11:
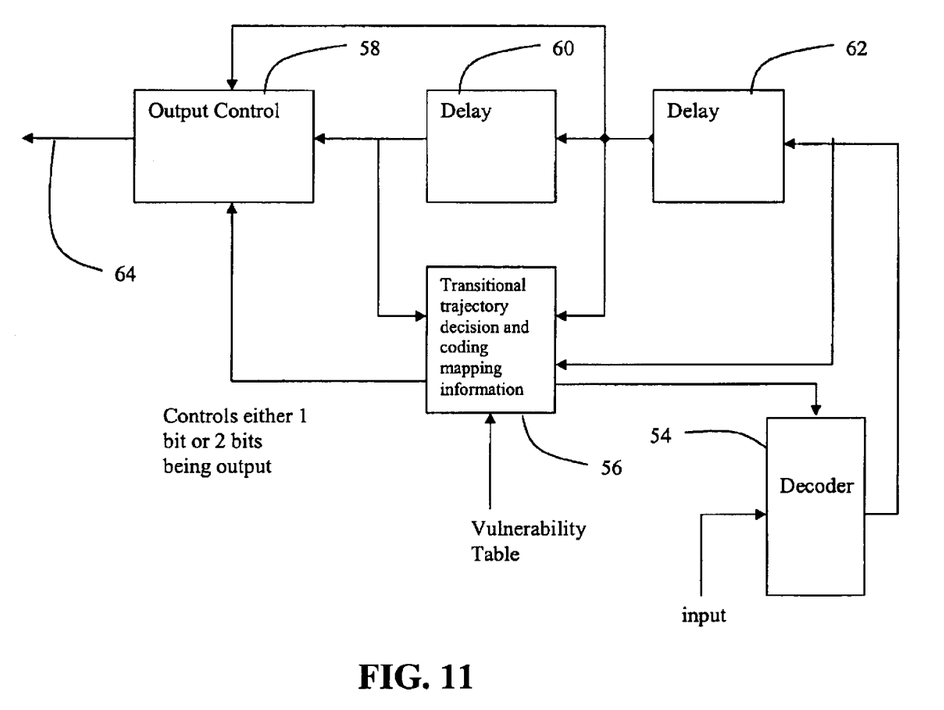
FIG. 11 a schematic block diagram of the FMC decoder elements for the DQPSK receiver corresponding to the transmitter FMC elements disclosed in FIG. 10.

Returning to FIG. 9, the signal is then modulated using QAM in the QAM block 26. In the receiver 28, the incoming signal is demodulated in the QAM block 30 followed by error checking with redundancy as defined by the FMC block 32 which accomplishes the decoding from the redundancy and encoding applied in FIG. 10 as shown in FIG. 11. The signal is then processed through normal RS decoding in RS coding block 34. The FMC is used jointly with the Reed Solomon coding to reduce the error rate to a level where the RS coding can effectively be applied. Referring to FIG. 11, the FMC decoding for the exemplary embodiment shown employs a modified Viterbi decoder. The basic decoding of the incoming code is accomplished in decoder 54, which for the exemplary 2 bit sample example results in a corresponding input bit length as in a normal Viterbi decoder. For decoding, the encoder memory also incorporates the vulnerability data present for the FMC application. As shown in FIG. 11, the incoming QAM modulated signal from the channel will be first delayed by the delay element or buffer 62. The transitional trajectory or the differential positions will be detected by comparing the signals before and after the delayed elements. Such information is compared with the mapping tabled as defined in the vulnerability table. As the example shown in the exemplary DQPSK in FIG. 7, 8 and 10, when the clockwise trajectory is detected, it means one bit "1" is received. Otherwise two bits, starting with "0", are received. The decoded data is subjected to rotation direction (trajectory) detection circuit 56 and output bit length control 58 to compensate for the redundancy added during the FMC encoding process. The trajectory detection circuit includes transitional trajectory decision and coding mapping information for feedback from the trajectory detection circuit to the decoder for decoding path development.

Redundant data is placed in a first buffer 60 and second buffer 62 for comparison of last sample and next sample data for trajectory determination and matching of redundancy sets for reprocessing if required. The data is then provided on output 64 for Reed Solomon decoding as shown in FIG. 9.

Figure 12:
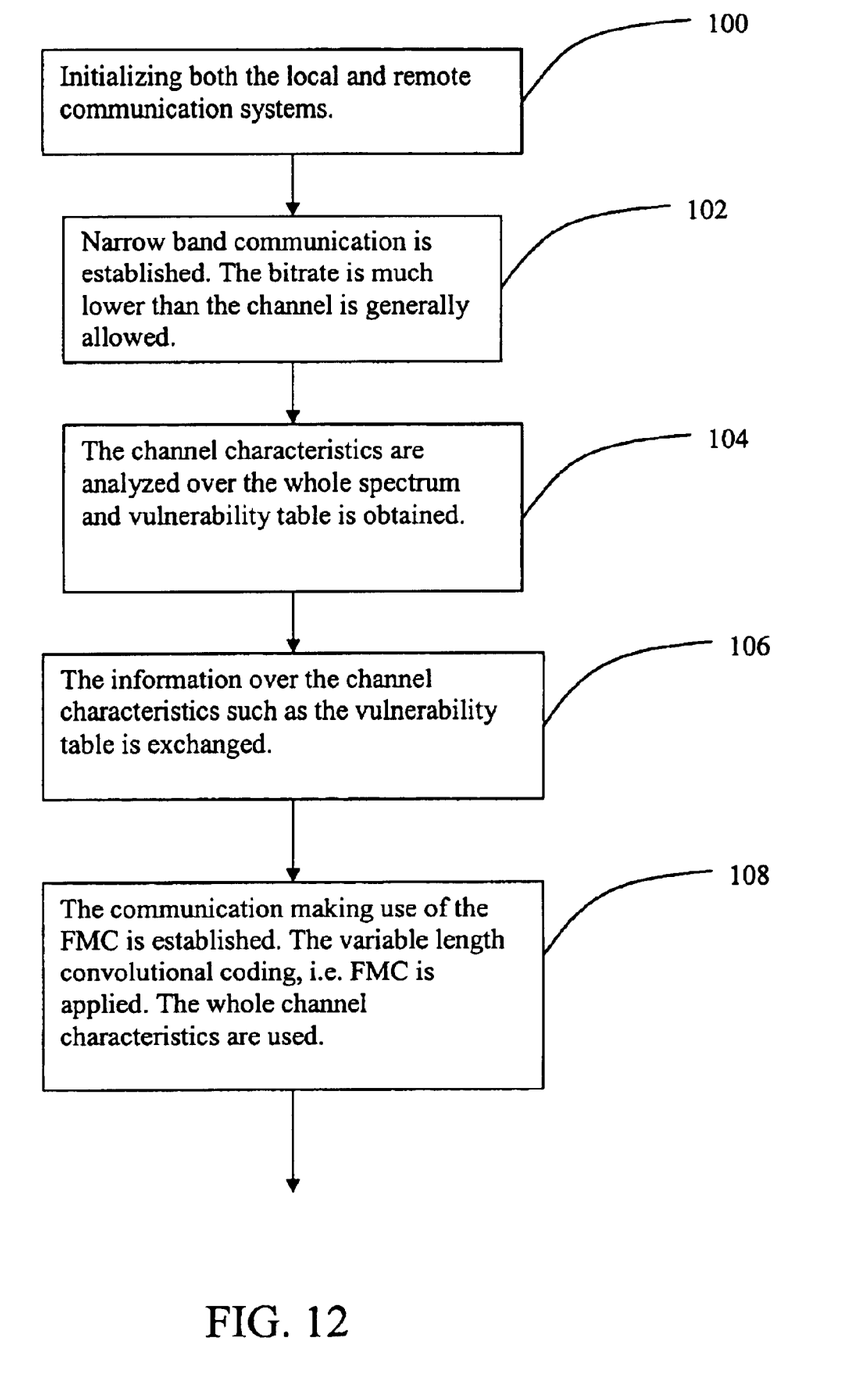
FIG. 12 is a flow chart of an exemplary initialization and training sequence for a system employing the FMC architecture.

For a generalized case, the FMC redundancy approach is defined as described in the flow chart of FIG. 12. The transmitter and receiver of both the local and remote communications systems are initialized 100. An initial narrow band communication is established with a bit rate much lower than the channel capability 102 to allow reduced error communication. The channel characteristic is analyzed over the whole spectrum and a vulnerability table is generated with a training sequence 104. The vulnerability table is then exchanged between the local and remote systems 106. Communications making use of the FMC is established at the operational channel bandwidth 108. The variable length (added redundancy) convolutional coding created by the FMC is applied to transmitted and received signals by the local and remote system to fully employ the whole channel characteristic.

Figure 13:
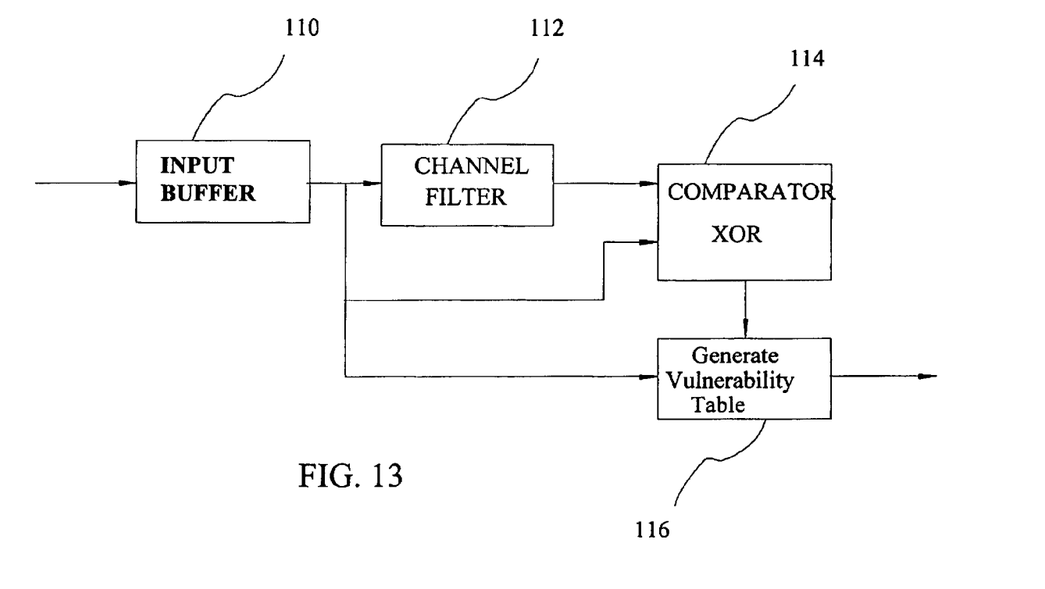
FIG. 13 is a schematic block diagram of the system elements for performing the exemplary sequence of FIG. 11; and, FIG. 14 is a graphical estimation of the BER based on SNR with exemplary Reed Solomon coding only, Trellis Coding and RS coding using the FMC of the present invention.

FIG. 13 demonstrates an embodiment of the FMC coding block for a time domain implementation to generate the vulnerability table during the training sequence. A random signal is received in the buffer 110 and processed in the normal manner. A filter 112 with the channel characteristic, which may comprise transmission of the data over the channel itself, receives the data stream and provides the filtered data to one input of an exclusive-or (XOR) comparator 114 receiving the raw data stream from the encoder on the other input. The comparator output provides the control signal to the vulnerability table generator 116 also receiving the raw data stream at its input. If a segment of the data stream has a characteristic matching the channel filter, it will be filtered and no error output will be provided to the comparator. The data stream present on the other input to the comparator will pass the XOR function resulting in a control signal requiring no redundancy addition. If a segment of the data stream is not matched, the XOR function will not be satisfied and a vulnerability level will be added to the data. The redundancy logic of the FMC will add redundancy to the data stream based on the input data and vulnerability table created with a mapping code and resynchronize the data stream for output to the modulator as previously described with respect to FIGS. 4–10. The time domain pattern in each data segment is retained and each pattern is transmitted to the receiver. Such patterns in the time domain are related to the frequency response of the channel. Each segment pattern can be used by the receiver to produce an original signal with different length, and therefore to achieve better error correction results.

In the generalized case, the FMC receives a sample into a buffer corresponding to the input control circuit of FIG. 10. A comparison of the sample to the vulnerability table determines the redundancy to be added comparable to the one bit delay buffer of FIG. 10.

For the FMC operation in the receiver, it is important to make use of the information in the information exchange stage as shown in FIG. 12. The FMC decoder obtains redundancy mapping code information and then applies error correction with different redundancy. As the result, different error correction capabilities are applied to different segments.

Figure 14:
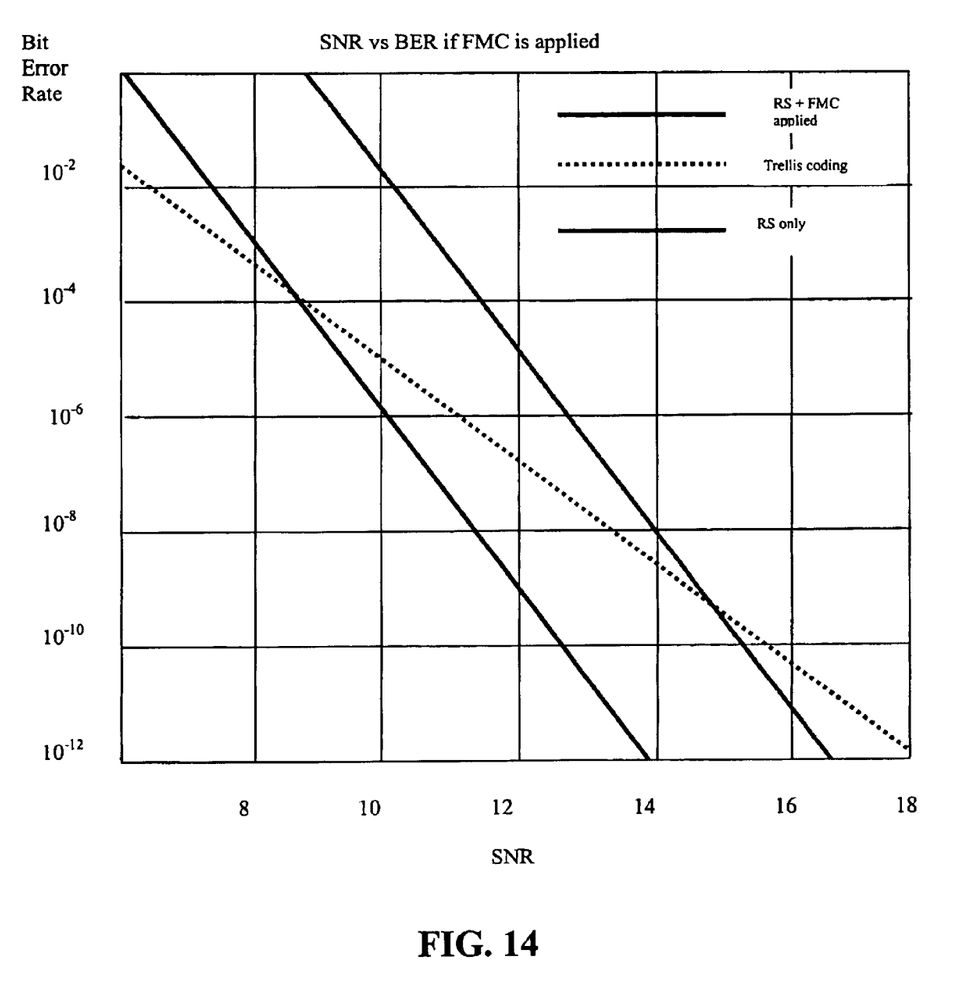

The FIG. 14 depicts the simulated results with the FMC scheme of the present invention in conjunction with Reed-Solomon encoding in comparison with standard trellis coding and with RS encoding/decoding alone. The analytical result indicates about 2 dB improvement can be obtained.

Having now described the invention in detail as required by the patent statutes, those skilled in the art will recognize modifications and substitutions to the specific embodiments disclosed herein. Such modifications are within the scope and intent of the present invention as defined in the following summary.

What is claimed is:

1. A communications system for a predetermined channel characteristic comprising:

means for outer encoding a data stream for error detection;

means receiving the encoded data for determining if data to be transmitted by the system will likely be degraded by the channel characteristic;

means for adding redundancy to the data responsive to the determining means;

means for inner encoding the data with the added redundancy; and, means for transmitting the data.

2. A communications system as defined in claim 1 wherein the determining means comprises means for determining the trajectory of a sample relative to the prior and next samples;

the means for adding redundancy comprises a non-linear feed-back mechanism and variable input control mechanism; and the means for encoding the data with added redundancy is a convolutional encoder.

3. A communications system as defined in claim 1 wherein the determining means comprises a vulnerability table derived from a filter having the predetermined channel characteristic and receiving sample data and an XOR comparator receiving an output from the filter on a first input and the sample data on a second input.

4. A communications system as defined in claim I further comprising:

means for receiving the transmitted data;

means for decoding the inner encoded data connected to the receiving means;

means for assessing if the decoded data has added redundancy;

means for compensating for the redundancy in the decoded data; and, means for decoding the outer encoding for error correction.

5. A communications system as defined in claim 4 wherein the assessing means comprises a trajectory detection means.

6. A communications system as defined in claim 1 wherein the outer encoding means is a Reed Solomon encoder.

7. A communications system as defined in claim 4 wherein the means for decoding the inner encoded data is a Viterbi decoder.

* * * * *